W. S. PARSONS.
SYSTEM OF AND APPARATUS FOR THE DISPOSAL OF SEWAGE AND OTHER REFUSE FROM STEAMSHIPS AND OTHER VESSELS.
APPLICATION FILED JAN. 24, 1917.

1,291,628.

Patented Jan. 14, 1919.

Inventor,
William Steel Parsons,
By Henry Orth Jr. atty.

W. S. PARSONS.
SYSTEM OF AND APPARATUS FOR THE DISPOSAL OF SEWAGE AND OTHER REFUSE FROM STEAMSHIPS AND OTHER VESSELS.
APPLICATION FILED JAN. 24, 1917.

1,291,628.

Patented Jan. 14, 1919.

Inventor,
William Steel Parsons,
By Henry Orth Jr
Atty.

W. S. PARSONS.
SYSTEM OF AND APPARATUS FOR THE DISPOSAL OF SEWAGE AND OTHER REFUSE FROM STEAMSHIPS AND OTHER VESSELS.
APPLICATION FILED JAN. 24, 1917.

1,291,628.

Patented Jan. 14, 1919.

Inventor,
William Steel Parsons,
By [signature] atty.

UNITED STATES PATENT OFFICE.

WILLIAM STEEL PARSONS, OF GROVE PARK, ENGLAND, ASSIGNOR TO J. STONE & COMPANY LIMITED, OF DEPTFORD, ENGLAND.

SYSTEM OF AND APPARATUS FOR THE DISPOSAL OF SEWAGE AND OTHER REFUSE FROM STEAMSHIPS AND OTHER VESSELS.

1,291,628.	Specification of Letters Patent.	Patented Jan. 14, 1919.

Application filed January 24, 1917. Serial No. 144,202.

*To all whom it may concern:*

Be it known that I, WILLIAM STEEL PARSONS, a subject of Great Britain and Ireland, residing at "Glymedale," Baring Road, Grove Park, in the county of Kent, England, have invented certain new and useful Improvements in Systems of and Apparatus for the Disposal of Sewage and other Refuse from Steamships and other Vessels, of which the following is a specification.

This invention relates to a system of and apparatus for the disposal of sewage and other refuse from steamships and other vessels.

According to this invention, the system for the discharge of sewage and other refuse from ships comprises, in combination, a receptacle, in communication with the soil pipes or waste- or discharge-pipes of water closets, sinks or other devices adapted in the first place to receive the refuse and which are to be emptied, an induced current apparatus or hydraulic ejector connected to such receptacle for the purpose of causing its contents to be discharged through the bottom of the ship, or through the side of the ship below the water line, means such as a pump, for forcing a stream of water through the induced current apparatus and power means, such as a steam engine, electric motor or other prime mover, for driving the said pump, the starting and stopping of the engine being preferably made dependent on the level of liquid in the receptable. Preferably, means are also provided for automatically maintaining the closure of the receptacle against the induced current apparatus and, consequently, against the sea, until the velocity of flow of water through the said apparatus is sufficient to properly induce the flow and discharge of the sewage through the said apparatus.

Figure 1 of the accompanying drawings is a transverse section of part of a ship provided with apparatus constructed according to the invention for the disposal of sewage and other refuse into the sea through the bottom of the ship.

Figure 1:
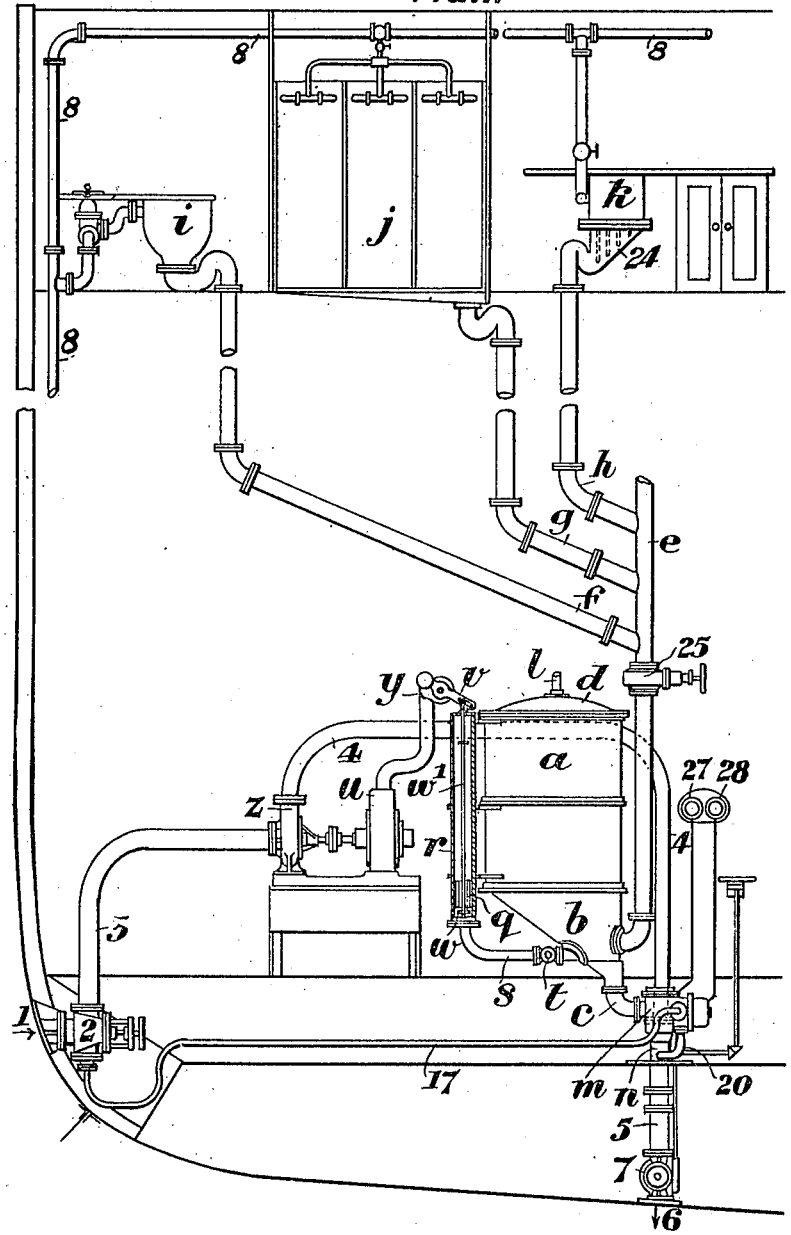
Figure 2:
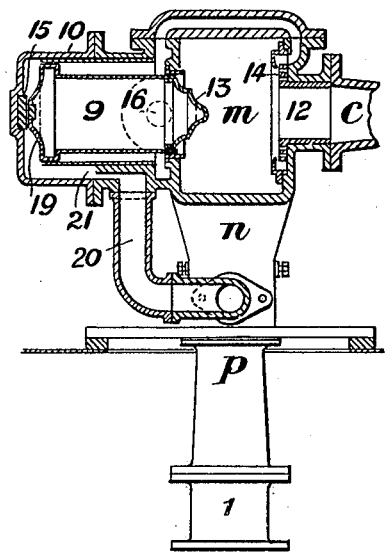
Fig. 2 is a sectional elevation to a larger scale of the apparatus for actually discharging the sewage and other refuse into the sea and Fig. 3 is a transverse section of such apparatus.
Figure 3:
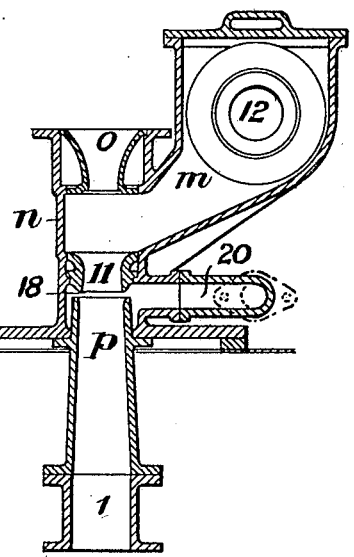

In carrying the invention into effect and according to the construction illustrated in Figs. 1, 2 and 3 the apparatus comprises a closed receptacle $a$ which suitably is more or less cylindrical in form but, preferably, the upper part is cylindrical and the lower portion $b$ is more or less in the form of a hopper. Or, obviously, the shape of the receptacle may be made to conform to the space or place in the ship available for the purpose. Nevertheless, the lower portion $b$ is preferably made, more or less, in the form of a hopper and at its lowest point, it is provided with a pipe connection $c$ for the discharge of its contents. At its upper end, it is provided with a cover $d$ which is bolted air-tight thereto. Near the bottom, or it may be higher up the said receptacle is, moreover, furnished with an inlet orifice, to which is connected a pipe $e$ to which are connected other pipes such as $f$ $g$ and $h$ leading from all the water closets $i$, urinals $j$ and sinks $k$ respectively or from other refuse receivers in the ship or in that particular section or compartment of the ship, if, as is sometimes the case in large ships, the ship is divided into more or less independent sections or compartments by means of water-tight bulkheads. An air vent pipe $l$ is provided in the cover of the receptacle to permit of escape of air into a suitable shaft, while the receptacle is filling, and to admit air while the receptacle is being discharged.

The discharge pipe $c$ at the base of the closed receptacle $a$ is suitably connected to an inclosed funnel-shaped or hopper-like structure $m$ (best seen in Figs. 2 and 3) the lower end of which structure is made integral with or connected to an induced current device $n$ of the type described in the specification of applicant's prior Letters Patent No. 1131951 of 1915. This apparatus has a contracted or coned water-jet nozzle $o$ (Fig. 3) and a flared or reversely coned delivery pipe connection $p$, in such operative relation with the nozzle $o$, that the sewage or refuse arriving from the hopper-like structure $m$, is sucked into the stream and passes out into the sea, through the ship's bottom. The inclosed receptacle $a$ is suitably provided with an annular float $q$ which may be in the said receptacle, or, preferably, as shown in Fig. 1, in a float chamber $r$ connected thereto by the pipe $s$ having a cock or valve $t$ and this float is adapted to directly start and to indirectly stop an engine or steam turbine, such as indicated at $u$, or other prime mover. In rising, the float $q$ comes into contact with the counter weighted and slotted lever $v$ keyed to the spindle of the valve $y$ for controlling the supply of steam to the turbine $u$, but when the liquid level in the float chamber $r$ falls, the float in descending comes to rest on a disk $w$ fixed at the bottom of a rod $w'$, freely passing through the float and suitably connected at its other end in the slot in the lever $v$, with the result that the weight of the float pulls down the rod $w'$ and closes the valve $y$. The turbine is adapted to drive a pump $z$ for causing a flow of water from 1, through the valve 2, suction pipe 3, and delivery pipe 4, through the induced current device $n$, with the consequent induction and discharge of the sewage and the like into and out of the discharge pipe 5 into the sea at 6. The discharge pipe 5 is conveniently provided with a cock and valve 7. Water for flushing the water closets $i$, urinals $j$ and sinks $k$ or the like is conveniently supplied from a suitable source through a pipe 8. In order to provide against the entry of water from the sea into the receptacle $a$ when the velocity or pressure of the water flowing through the induced current apparatus cannot overcome the pressure of the sea water, special means influenced by the pressure of the sea water itself are provided to close the pipe or passage between the induced current apparatus and the receptacle, such special means being, suitably, of the type described in the applicant's prior patent specification No. 1102351 of 1914. For example and as shown in Figs. 2 and 3, the hopper-like structure $m$ is provided with a differential floating piston or ram 9, fitting loosely in a cylinder 10 formed in one with, or bolted to, the casing of the hopper-like structure above the intermediate nozzle 11 and opposite the connection 12 for the pipe $c$ from the receptacle $a$. The smaller end of this piston or plunger passes out through the end of the cylinder 10 nearer to the connection 12 and is suitably tapered or reduced in diameter at 13, so as to prevent any solid matter from lodging thereon and the said smaller end of the plunger is moreover adapted to serve as a valve, seating itself against a seating 14 of metal or other suitable material preferably outside of and concentric with the connection 12 before referred to. If desired, the other and inclosed end of the cylinder may be provided with a buffer 15 to take the shock of the piston or ram 9 when it travels in the direction to remove the valve 13 from its seat 14. The cylinder 10 is in constant free communication with the sea, at 16 near the end through which the smaller end of the piston or ram projects by means of a pipe 17 connected to the suction pipe 3 of the pump $z$ and, consequently, the pressure of the sea water normally leaking past and acting on the larger area 19 of the ram or piston tends to cause it to travel and make the small end 13 thereof acting as a valve, seat itself against the seating 14 around the sewage outlet orifice 12. In order, however, that the valve may open when the induced current apparatus is working properly the intermediate cone or nozzle 11 is spaced a little from the cone or delivery pipe connection $p$. This space affords an opening 18 which communicates by a pipe 20 and a chamber 21 with the outer end of the cylinder 10. Thus the stream of water flowing through the cones or nozzles of the induced current apparatus, also creates a suction which is applied to the large end 19 of the piston or ram 9. When this suction effect takes place and is sufficiently strong, the pressure on the annular area of the ram 9, becomes effective causing the piston or ram 9 to travel away from the valve seat 14 and, consequently, any sewage in the receptacle $a$ flows into the induced current apparatus and is discharged into the sea. If desired, the face of the valve seat 14 may be rinsed or sparged by an annular rinsing device 22 surrounding the said seat and communicating, by a pipe 23 either with the cylinder 10, or with the sea water inlet pipe 17.
In the event of the apparatus being destined to effect the disposal of the refuse from the galley and pantry or the like, a hopper or the like may be provided with any suitable means for crushing bones and other solid bodies, before these are allowed to pass away and, preferably, a selective grid or grating 24 (Fig. 1) of the kind described in the applicant's prior patent specification No. 1138245 of 1915 is provided having for its object to prevent the passage of any article of such dimensions as could become arrested in a pipe or across any opening in the apparatus.

The sewage receptacle $a$ may be isolated from the water closets and other devices by means of a sluice or gate valve 25. Furthermore the suction pipe of the pump is conveniently furnished with a valve 2 and as aforesaid the delivery pipe 5, to the sea is suitably provided with a valve 7 for cutting off communication with the sea, for allowing of the inspection of the apparatus or for the case in which the apparatus is intended to be operated intermittently, that is, at predetermined times or when the receptacle is sufficiently charged. 27 and 28 are gages for indicating respectively the pressure in the induced current apparatus and the pressure in the cylinder 10.

Figure 4:
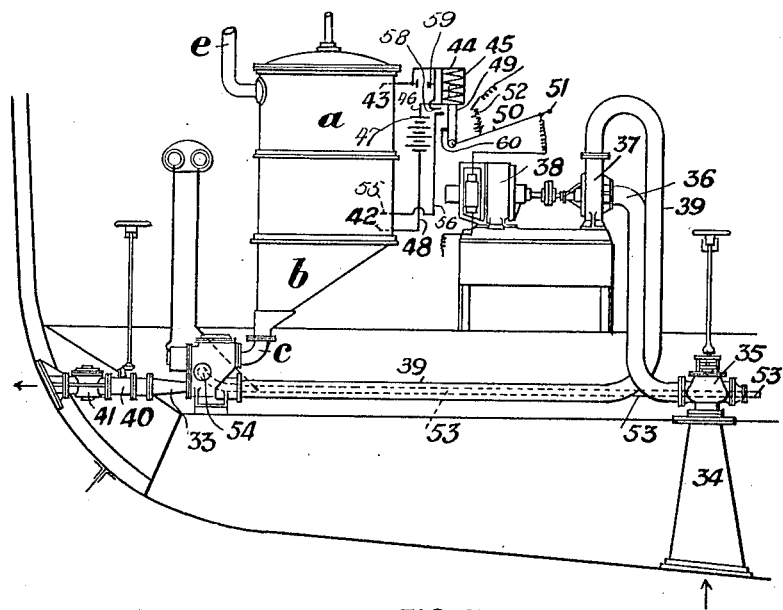
Fig. 4 is a transverse section of a ship provided with a modified construction of apparatus and in which the sewage is discharged through the side of the ship.
Figure 5:
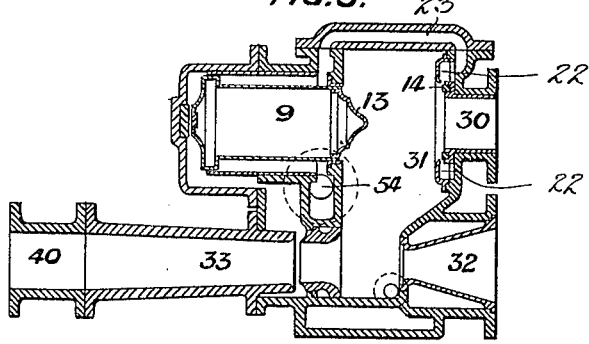
Fig. 5 is a sectional elevation to a larger scale of the apparatus seen in elevation in Fig. 4 for actually discharging the sewage and other refuse into the sea.

As shown in Figs. 4 and 5, the upper portion of the receptacle $a$ is connected to the water closets, urinals, sinks or like by a pipe $e$ or there may be more than one such pipe. The discharge pipe $c$ at the lower end of the receptacle $a$ is connected through an opening 30 (Fig. 5) to a funnel-shaped or hopper-like structure 31, the lower end of which is made integral with or connected to an induced current device having a contracted or coned water-jet nozzle 32 and a flared or reversely coned delivery-pipe connection 33 into which the sewage or refuse is sucked by the stream of water passing out of the nozzle 32. The water for causing the induced current, in this example passses up a pipe 34 (Fig. 4), open to the sea at the bottom of the ship, past a valve 35 for controlling the inlet of water and thence through the suction pipe 36 to the pump 37, which is conveniently driven by an electric motor 38. The pump 37 discharges the water through the pipe 39 to the nozzle 32 (Fig. 5) of the induced current apparatus and the water with the sewage and other refuse passes out of the ship's side through the reversely coned delivery pipe connection 33 and the pipe 40 provided with a valve 41 (Fig. 4) for closing the discharge pipe to the sea, when required. In this construction, the liquid on reaching a certain level in the receptacle $a$ (Fig. 4) is adapted to close an electric circuit, which will, preferably, indirectly effect the starting of an engine or motor. For this purpose the receptacle is provided with three contacts 42, 55 and 43 which project into the interior thereof. The contact 43, for example, is connected by a wire 44 to one end of the coil of a magnet or solenoid 45 while the other end of the coil is connected by a wire 46 to one pole of a battery 47, the other pole of which is connected by a wire 48 to the contact 42. The third contact 55 is connected, by a wire 56, to a switch arm 57, the other and fixed portion 58 of the switch being connected, by a wire 59, to the wire 46 or directed to the upper terminal of the coil of the solenoid 45. The armature or core 49 is provided with a projection or nose-piece 60 and is connected at one end to a lever device 50 for controlling the power means. This lever 50 is fulcrumed at 51 and is provided with an appropriate contact adapted to make contact with one or other of the contacts of the starting resistance 52 in the circuit of the electric motor 38. When the liquid rises in the receptacle $a$ so as to submerge the contact 43, the battery circuit is closed and the solenoid 45 is energized, with the result that the core 49 is attracted, thereby raising the lever 50, gradually closing the circuit of the motor 38 and causing the motor to start and drive the pump 37. In addition, the switch 57, 58 is closed by the nose piece 60, as the core 49 rises, with the result that current from the battery 47 continues to flow through the coil of the solenoid by way of the wire 59, switch 58, 57, wire 56, contact 55, the liquid in the receptacle $a$, contact 42, and wire 48 to the other pole of the battery, even though the circuit including the contact 43, may be broken by the level of the liquid sinking below it. The pump sucks water up the pipe 34 and delivers a stream of water through the induced current apparatus, drawing out the contents of the receptacle $a$ and discharging same into the sea through the pipe 40 and opened valve 41. As soon as the liquid level sinks below the contact 55, the circuit, including the switch 57, 58, is broken, the core 49 falls and the current is shut off from the motor 38. As in the previous example the valve 35 of the inlet pipe 34 is conveniently furnished with a branch pipe 53, which is connected to the induced current apparatus at 54 for supplying water, at the pressure of the sea, to the cylinder of the piston or ram 9 and for rinsing the valve seat 14 (Fig. 5). This apparatus resembles that illustrated by Figs. 2 and 3 in every respect except that the contracted or coned water-jet nozzle 32 and the flared or reversely coned delivery pipe connection 33 are horizontal instead of vertical.

I claim:—

In apparatus of the class described, an induced current apparatus comprising a casing having an inlet aperture, means to inject a stream of water through said casing, a cylinder connected with the latter, a floating differential piston in said cylinder arranged to seat in said aperture, a sewage tank connected to said aperture, the discharge of which is dependent upon the operation of said differential piston upon the establishment of the stream of water through the casing, an annular rinsing device surrounding said aperture for rinsing off said piston, controlled by said piston, and mechanism dependent on the level of the liquid in said tank for automatically starting and stopping said apparatus.

WILLIAM STEEL PARSONS.